(12) United States Patent
Wenger

(10) Patent No.: US 12,739,096 B2
(45) Date of Patent: Sep. 15, 2026

(54) CIRCUIT FOR A COMBINED KEY VALUE-DEPENDENT EXCHANGE AND RANDOMIZATION OF TWO VALUES

(71) Applicant: Infineon Technologies AG, Neubiberg (DE)

(72) Inventor: Erich Wenger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 114 days.

(21) Appl. No.: 18/387,331

(22) Filed: Nov. 6, 2023

(65) Prior Publication Data

US 2024/0163074 A1 May 16, 2024

(30) Foreign Application Priority Data

Nov. 9, 2022 (DE) ......................... 102022129607.5

(51) Int. Cl.
*H04L 9/00* (2022.01)

(52) U.S. Cl.
CPC .................................... *H04L 9/002* (2013.01)

(58) Field of Classification Search
CPC ....... H04L 9/085; H04L 9/0894; H04L 9/002; H04L 9/003; G06F 21/755
See application file for complete search history.

(56) References Cited

U.S. PATENT DOCUMENTS 9,400,636 B2 7/2016 Meyer
9,590,805 B1 3/2017 Parkinson
11,424,907 B2 8/2022 Ghosh et al.
2002/0186848 A1* 12/2002 Shaik ..................... H04L 9/002 380/285

(Continued)

FOREIGN PATENT DOCUMENTS

EP 3202079 B1 7/2020
GB 2403308 B 6/2006
WO 2020146285 A1 7/2020

OTHER PUBLICATIONS

Michael Tunstall and Louiza Papachristodoulou and Kostas Papagiannopoulos. Boolean Exponent Splitting. 2018. Cryptology {ePrint} Archive, Paper 2018/1226. (Year: 2018).*

(Continued)

*Primary Examiner* — Jeremy S Duffield
(74) *Attorney, Agent, or Firm* — Murphy, Bilak & Homiller, PLLC

(57) ABSTRACT

According to various embodiments, a circuit for a combined key value-dependent exchange and randomization of two values is described comprising a control input circuit configured to supply two or more shares of a key to an exchange and randomizing circuit, wherein the exchange and randomizing circuit is configured to supply each of the two values to one of two inputs, wherein it depends on at least a first share of the shares which value of the two values is supplied to which input of the two inputs, arithmetically combine, for each of the two inputs, the value supplied to the input with a randomization value to generate a respective randomized value and to store the randomized values in two result locations, wherein it depends on at least a second share of the shares which randomized value is stored into which result location of the two result locations.

15 Claims, 3 Drawing Sheets

(56) References Cited

U.S. PATENT DOCUMENTS

2005/0262127 A1* 11/2005 Mishra ................ H04L 47/2441 707/999.102
2006/0153372 A1 7/2006 Kim et al.
2007/0064930 A1* 3/2007 Fischer .................. H04L 9/003 380/28
2009/0067617 A1* 3/2009 Trichina .................. G06F 7/723 380/28
2009/0214025 A1 8/2009 Golic
2012/0207298 A1 8/2012 Meyer et al.
2013/0305392 A1 11/2013 Bar-El et al.
2014/0164785 A1* 6/2014 Ochiai .................. H04L 9/0816 713/189
2016/0277179 A1 9/2016 Tunstall
2017/0187529 A1 6/2017 Guilley et al.
2017/0257210 A1* 9/2017 Tunstall .................. H04L 9/003
2020/0266970 A1* 8/2020 Rietman ................. G06F 7/764
2020/0287712 A1 9/2020 Macchetti et al.
2021/0184831 A1 6/2021 Chen
2021/0194666 A1 6/2021 Georgieva et al.
2021/0194689 A1 6/2021 Susella et al.
2021/0391975 A1 12/2021 Tunstall
2021/0409188 A1 12/2021 Ghosh et al.
2022/0075879 A1 3/2022 Hamburg et al.
2024/0281214 A1 8/2024 Simon
2024/0396726 A1* 11/2024 Rindal .................. H04L 9/0618

OTHER PUBLICATIONS

Coron, Jean-Sebastien , “Resistance against Differential Power Analysis for Elliptic Curve Cryptosystems”, Ç.K. Koç and C. Paar (Eds.): Cryptographic Hardware and Embedded Systems, vol. 1717 of the series Lecture Notes in Computer Science, Worcester, MA, Aug. 1999, pp. 292-302.

* cited by examiner

SECOND COMM. DEVICE

103

101

FIRST COMM. DEVICE

Memory
a0
a1
202
203
204
200
exch0
exch1
exch2
exch3
exch4
r0
r1
r2
r3
r4
205
ADD
201

CIRCUIT FOR A COMBINED KEY VALUE-DEPENDENT EXCHANGE AND RANDOMIZATION OF TWO VALUES

TECHNICAL FIELD

The present disclosure relates to circuits for a combined key value-dependent exchange and randomization of two values.

BACKGROUND

For securing operations like Modular Exponentiation (ME) or Scalar Multiplication (SM), which are central operations in most of today's public key cryptosystems, like RSA, Diffie-Hellman (DH), ECDSA, or ECDH, and many more, against side-channel attacks, a key-dependent exchange of values may be performed. This means that a pair of values (A, B), which result from two operations, are processed by a key-dependent operation to generate a new pair of values (X, Y) which is then used for further operations, wherein depending on the key (bit) the pair (X, Y) is equal to (A, B) (B, A).

However, this exchange operation may itself be subject to side-channel attacks: power traces can be analyzed when operating on the key and can reveal the key. Further, an attacker can analyze power traces when A and B are processed and e.g., compare the Hamming weights of words of A with the ones of X and Y and determine whether A's Hamming weight is closer to X or Y. Such side-channel attacks get even more efficient when multiple words are processed.

Accordingly, approaches which effectively protect against such kind of attacks are desirable.

SUMMARY

According to various embodiments, a circuit for a combined key value-dependent exchange and randomization of two values is provided including an exchange and randomizing circuit and a control input circuit configured to split a key value into two or more shares and to supply the two or more shares to the exchange and randomizing circuit, wherein the exchange and randomizing circuit is configured to supply each of the two values to one of two inputs, wherein it depends on at least a first share of the two or more shares which value of the two values is supplied to which input of the two inputs, arithmetically combine, for each of the two inputs, the value supplied to the input with a randomization value to generate a respective randomized value and to store the randomized values in two result locations, wherein it depends on at least a second share of the two or more shares which randomized value is stored into which result location of the two result locations.

BRIEF DESCRIPTION OF THE FIGURES

In the drawings, similar reference characters generally refer to the same parts throughout the different views. The drawings are not necessarily to scale, emphasis instead generally being placed upon illustrating the principles of the invention. In the following description, various aspects are described with reference to the following drawings, in which:

FIG. 1 shows a communication arrangement according to an embodiment,

DETAILED DESCRIPTION

Figure 2:
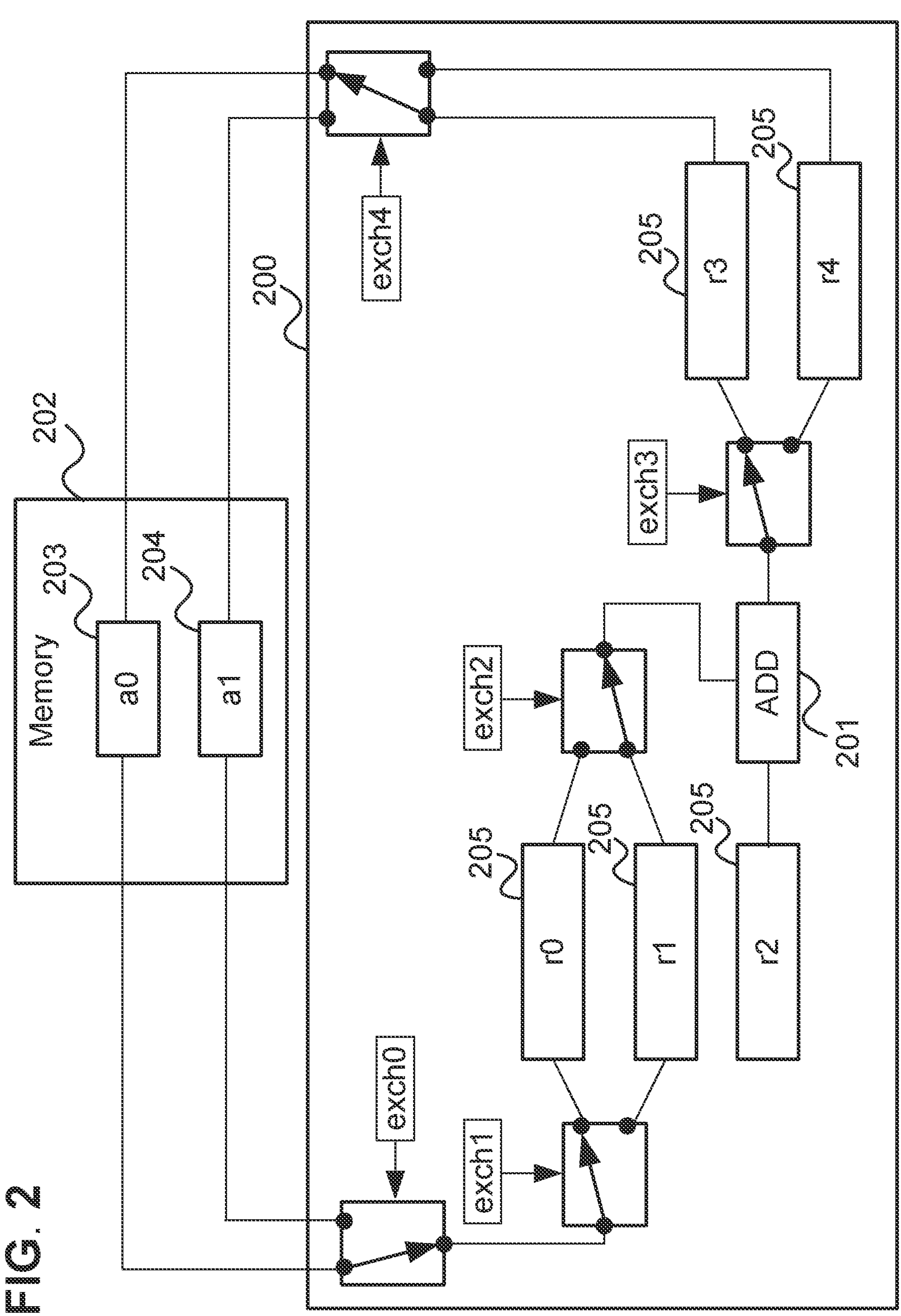
FIG. 2 shows an exchange and randomizing circuit according to an embodiment.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
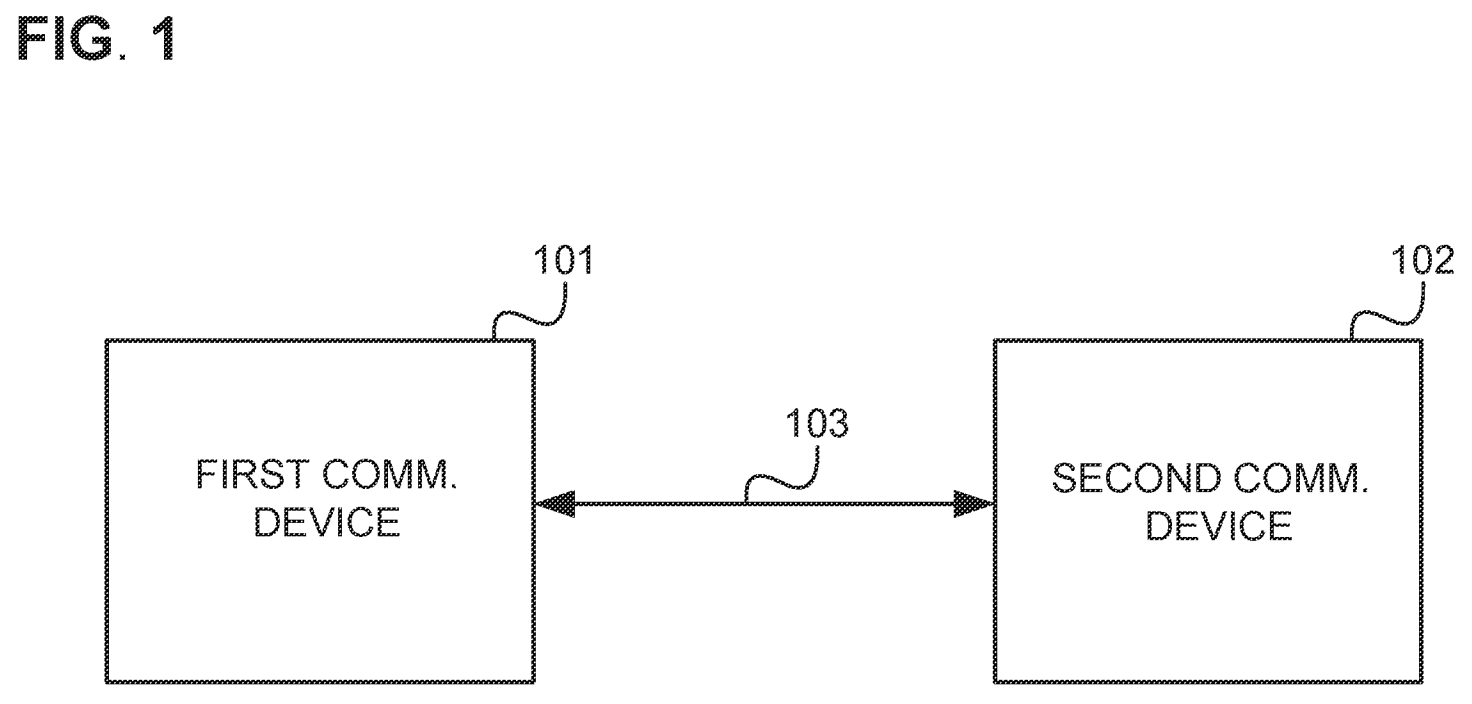

FIG. 1 shows a communication arrangement 100 according to an embodiment.

The communication arrangement 100 includes a first communication device 101 (or first communication party) and a second communication device 102 (or communication second party).

For, example the first communication device 101 is a smart card like for example a debit or credit card and the second communication device 102 is for example a card reader which is part of a corresponding terminal such as an ATM (Automated. Teller Machine) or a Point-of-Sale (POS) terminal, Embodiments may be also be applied to other scenarios where one or both of the communication parties 101, 102 are implemented by other processing and/or communication devices like a personal computer, laptop, tablet, server, IoT (Internet of Things) device, microcontroller, smart card, secure microcontroller, dongle, hardware root of trust, (embedded) secure element (ESE), Trusted. Platform Module (TPM), or Hardware Security Module (HSM).

One application example is electronic payment where a user of a smart card 101 wants to pay (i.e., use a payment service) at the card reader 102. For this, a communication channel 103 is establishment for exchange of corresponding messages. The communication channel 103 (which may be contact-based or contact-less) should be secure for authentication of the smart card 101 at the card reader 102, protection against modifications of messages and protection against eavesdropping.

A typical approach to establish a secure communication channel is to a generate a session key between the communication parties 101, 102 in accordance with a key agreement protocol (i.e., a key exchange). Messages may then be exchanged securely by encrypting them on the sender side and decrypting them on the receiver side using the session key. An example for a key exchange protocol is the Diffie-Hellman protocol. Depending on the application scenario, other cyptosystems like for example RSA may also be used, in particular for secure transmission of content but also for signing messages, for example. Other use cases include digital signatures, key encapsulation etc.

Modular Exponentiation (ME) or Scalar Multiplication (SM) with secret exponent or scalar are the central operations in most of today's public key cryptosystems, like RSA, Diffie-Hellman (DH), ECDSA, or ECDH, and many more. These operations combine a secret integer value d (the exponent or scalar) with a possibly public value M or P (the base M or the base point P on an elliptic curve E(F_p)) to gain an output value (M^d mod N or d*P) that can be published without compromising the secret d.

Based on this triplet with this special property, many encryption or signature algorithms are defined. The security of these methods depend on the fact that d is only known to its owner while all other parameters and values may be public.

Modular Exponentiation (ME) is used in systems like RSA and Diffie-Hellman. In this situation a modulus integer N is public. In most cases this is either a large prime number or the product of some large prime numbers. However, it can be any reasonable number. This number is defined and published by the owner of the secret key d, or it is defined by public sources (e.g., standard specifications).

In today's RSA and Diffie-Hellman cryptographic systems these integers tend to have a bit length of about 1024-4096, i.e., 2^{1024}<N<2^{4096}.

The base is also a large integer, usually from the interval [0,N[. It may be random or pseudorandom in this interval. It may be defined by standards or by a communication partner. Sometimes there are some restrictions on (M should not be =0, 1, N−1, etc., it should be a padded message, . . . ). The generic case however assumes M to be rather more or less uniformly coming from [0,N[.

The secret d is again an integer. Since it forms a secret, today's requirements are that d is at least 128 bits long, and it should be generated by a reasonably good random number generation process. In many cases d might have a similar bit length like N and M, or something in-between. Deviations from all these lengths and properties are possible, depending on the application.

The ME is now the modular exponentiation M^d mod N. It is based on the modular multiplication operation A*B mod N of two integers A,B. A common characterization of the modular product C:=A*B mod N is the uniquely defined value C in the Interval [0,N−1[ such that ((A*B)−C)/N is an integer.

The modular power M^d mod N is now mathematically defined as the (d−1) times modular product of Ni with itself. Since d is usually a very large number, the power can typically not be evaluated by (d−1) times computing a modular product. For calculating the power, the state of the art algorithms are the so called square-and-multiply-algorithms, which are very efficient in computing the d-th modular power of M. Algorithm 1 as described in the following is one example of such an algorithm:

It is assumed that d<2^n, for some integer n, and d_i is the i-th bit of the binary representation of d.

(Algorithm 1)

```
A <-- 1;
for i:=n−1 to 0 by −1 do
   A <-- A*A mod N
   if d_i=1 then
      A <-- A*M mod N
   end;
end;
return A;
```

It should be noted that in the following text, letters like A or B may stand for integers, points (with 2 or 3 coordinates), or even arrays of such, as clear from the respective context.

Scalar Multiplication (SM) SM is used in systems like ECDSA and ECDH. Here, a similar operation like the exponentiation is used. The difference is that the modular multiplication operation is substituted by an addition operation on a so called elliptic curve. An elliptic curve is a mathematical object defined over a field K. In most applications K is a finite field. An example for a finite field is Z/p=F_p, where p is a prime number.

An elliptic curve that is defined over K consists of a collection of points E(K). The points of an elliptic curve are in a natural way equipped with an addition operation E(K)×E(K)→E(K).

Here two arbitrary points of E can be added, and the sum is again a point of E. With this addition, the elliptic curve E(K) is an Abelian group. In particular, E(K) has a neutral element 0, with the property 0+P=P+0=P, for all points P on the curve.

In a communication system like the communication arrangement 100 of FIG. 1 where a cryptographic system based on elliptic curves is used, the communication partners 101, 102 usually work with a pre-defined elliptic curve. Common elliptic curves are defined over a finite field of the form K=Z/p=F_p, where p is a prime number of bit length 256-521 bits, or even more. However, other finite fields like binary fields are also used. The secret d is usually also of about this bit length.

The point P for the scalar multiplication is also either defined by standards, or given otherwise, e.g., by one of the communication partners 101, 102.

The scalar product of d with P is the result of the SM d*P on the elliptic curve E(K), and similarly to ME it is defined by $$d^*P := ( \ldots ((P+P)+P)+P)+ \ldots +P)$$

i.e., the (d−1)-fold addition of P with itself. Here the addition of E(K), mentioned above, is used.

A algorithm similar to algorithm 1 to efficiently compute this result is the double-and-add algorithm as follows.

(Algorithm 2)

```
A <-- 0; (zero point on E(K))
for i:=n−1 to 0 by −1 do
   A <-- A+A
   if d_i=1 then
      A <-- A+P
   end;
end;
return A;
```

For the implementation of the arithmetic of points on an elliptic curve, one usually represents a point of an elliptic curve in affine coordinates, i.e., by pairs (x,y) of values x,y from K. x and y are called the coordinates of the point. Such a pair is a point on the curve if x and y solve a certain polynomial equation over K. The polynomial equation is characteristic for the individual curve E. Additionally, the 0 (i.e., the zero point) is often represented by a symbol and not by coordinates.

The addition of two generic points (x1,y1) and (x2,y2) is then realized by certain polynomial terms, i.e., the computation of (x3,y3):=(x1,y1)+(x2,y2) is reduced to some modular arithmetic that is already known, e.g., from ME. Very often, these addition terms have certain hardships: One of these might be that the generic addition formula does not work if x1=x2 and/or y1=y2 (e.g., the case of a doubling). In these cases, a different set of formulae are typically used. But this means that, the operations A+A and A+P may have to be implemented with different formulae. This allows side channel attacks as further described below.

It should be noted there is another common way to represent a point on an elliptic curve, namely by a triple (x,y,z). Again, such a triple represents a point on the elliptic curve, if the three values x,y,z of K solve a certain characteristic polynomial equation. Two triples (x,y,z) and (x',y',z') represent the same point on the curve if there is a non-zero number/element r from K with x*r=x', y*r=y', and z*r=z' (wherein the multiplication here is the one in K.) This kind of representation is called projective coordinates. They have some advantages, e.g., that the 0 can also be represented by such a triple and need no extra artificial symbol. Furthermore there are different types of projective coordinate representations (e.g., Jacobian . . . ). For these kind of representations, there are addition and doubling formulas. They are similar to the formulae above but they may have some implementation advantages and disadvantages.

As briefly mentioned above, a security problem of a cryptosystem, in particular if used for embedded systems (credit cards, pass, TPMs, . . . ), are side channel attacks (SCRs). In case of a cryptosystem based on ME or SM these attacks use the fact that such an ME or SM has to be computed on a physical device and that the single operations take a certain characteristic kind of current consumption, electromagnetic emanation or timing.

As example, Algorithm 2. (as described above) is considered in the following: Since A+A and A+P are different operations (the first one is a doubling, while the second one is a generic addition) it can happen that the characteristic current consumptions of addition and doubling are visibly different, and an attacker may be able—looking at the power trace of such a computation—to identify the A+P operations and this directly leads to the secret exponent. Similar problems may arise with Algorithm 1. It should be noted that many other SCAs are known, but this is typically the simplest one.

A way to counteract these SCAs is called double-and-always-add, or square-and-always-multiply. The main idea is to not only compute the operations A*M mod N or A+P if the bit d_i is one, but compute them always. This needs an additional dummy-container B and leads to the modified versions of Algorithms 1 and 2 as follows.

(Algorithm 1a)

```
A <-- 1;
for i:=n-1 to 0 by -1 do
  A <-- A*A mod N
  if d_i=1 then
    A <-- A*M mod N
  else
    B <-- A*M mod N
  end;
end;
return A;
```

(Algorithm 2a)

```
A <-- 0; (zero point on E(K))
for i:=n-1 to 0 by -1 do
  A <-- A+A
  if d_i=1 then
    A <-- A+P
  else
    B <-- A+P
  end;
end;
return A;
```

So, in Algorithms 1a and 2a the multiply/addition operations are always done and the attacker may not distinguish between the cases d_i=0 and d_i=1. This results usually in a higher execution time (up to 33% more time), but for security reasons this might be affordable.

Nevertheless, it may be the case that the if-else instruction in Algorithms 1a and 2a has different characteristics if the if-branch was taken or the else-branch. So, an attacker might be able to distinguish the cases d_i=1/0 by just looking at this characteristic.

Because of this, implementers of secure cryptographic software would tend to not let secret information flow into the instructions itself. An alternative is e.g., by using an array instead of A and B, an array A[2] of two containers as in the following variants of Algorithms 1 and 2.

(Algorithm 1b)

```
A[1] <-- 1;
for i:=n-1 to 0 by -1 do
  A[1] <-- A[1]*A[1] mod N
  A[d_i] <-- A[1]*M mod N
end;
return A[1];
```

(Algorithm 2b)

```
A[1] <-- 0; (zero point on E(K))
for i:=n-1 to 0 by -1 do
  A[1]          <-- A[1]+A[1]
  A[d_i]        <-- A[1]+P
end;
return A[1];
```

In these cases, the A[0] is the dummy container B and A[1] is what A is in Algorithm 1 and 2.

These algorithms can be formulated slightly differently, if one uses an exchange mechanism EXCH((–,–),–), that works the following way:

$$(X,Y)=:EXCH((X,Y),0);$$

$$(Y,X)=:EXCA(X,Y),1);$$

i.e., EXCH exchanges two objects (a pair of values, a pair of points) if the second entry of the function is 1, and not if it is 0. With this, the algorithms can be formulated as:

(Algorithm 1c)

```
A <-- 1;
for i:=n-1 to 0 by -1 do
  A <-- A*A mod N
  B <-- A*M mod N
  (A,B)    <-- EXCH(A,B),d_i);
end;
return A;
```

(Algorithm 2c)

```
A <-- 0; (zero point on E(K)
for i:=n-1 to 0 by -1 do
  A <-- A+A
  B <-- A+P
  (A,B)    <-- EXCH(A,B),d_i);
end;
return A;
```

The exchange mechanism also fits very well into another variant of the double-and-always-add or square-and-alwaysmultiply algorithms, namely the Montgomery-ladder-like algorithms. These algorithms operate not only on one container A (possibly with a dummy B), but they operate actively on two containers A and B which are both "productive" (i.e., none of them is a dummy container). Corresponding variants of Algorithms 1 and 2 are given in the following.

(Algorithm 1d)

```
A <-- 1;
B <-- M;
for i:=n-1 to 0 by -1 do
   (A,B)          <-- EXCH((A,B),d_i);
   A    <-- A*A mod N
   B    <-- A*B mod N
   (A,B)          <-- EXCH((A,B),d_i);
   // Note: if d_i=0 then (A,B) <-- (A*A,A*B), i.e., A <-- A*A
   //    if d_i=1 then (A,B) <-- (A*B,B*B), i.e., A <-- A*A*M
   // Note: B = A * M
end;
return A;
```

(Algorithm 2d)

```
A <-- 0; (zero point on E(K))
B <-- P; (base point on E(K))
for i:=n-1 to 0 by -1 do
   (A,B)                    <-- EXCH((A,B),d_i);
   A    <-- A+A
   B    <-- A+B
   (A,B)                    <-- EXCH((A,B),d_i);
   // Note: if d_i=0 then (A,B) <-- (A+A,A+B), i.e., A <-- A+A
   //    if d_i=1 then (A,B) <-- (A+B,B+B), i.e., A <-- A+A+P
   // Note: B = A + P
end:
return A;
```

If it is assumed that the function EXCH( ) is implemented in a secure way, such that an attacker is not able to look at the power traces, etc., of the EXCH computations and evaluate directly the polarity of d_i, then it may be assumed that this implementations are secured against SCAs. After all, the EXCH( ) function is the only function that "touches" the bits d_i.

However, in reality, the EXCH-function is not the only information source for an attacker. If e.g., in Algorithm 1d the loop is unrolled, there is at some point the following situation:

```
...
fixed sequencel of computations on A and B
(A, B)    <-- EXCH((A,B),e);
fixed sequence2 of computations on A and B
...
```

For simplicity, e=d_i or something similar, i.e., e is a single bit that has to be kept secret.

If e=1 (exchange is done), the second and third line can also be described as fixed sequence2 of computations on B and A (in contrast to fixed sequence2 of computations on A and B if no exchange is done)

Now, if the attacker is able to distinguish between fixed sequence2 of computations on A and B and fixed sequence2 of computations on B and A the attacker able to evaluate the secret bit e.

In software (SW) and many hardware (HW) implementations of cryptographic algorithms, the long integers (like A and B in ME or the coordinates of A and B in SM) are stored and handled in arrays of words Bytes, 16-bit words, 32-bit-words, depending on the respective platform's or CPU's word size). So, an integer A is realized by an array a[0 . . . (m−1)] of m words. If for example the operation X*X mod N is realized in sequence2, for X being the first of the input variables (i.e., A in the one case or B in the other case), the CPU reads out the words x[i] in a certain (possibly fixed) order, works on them and computes the desired result. If the platform leaks some side channel information about the words that are used at this moment, an attacker may be able to distinguish between the two cases if e.g., the operation X*X is in fact computed with the number X=A or with the number X=B. Let for example the readout of the number X. (or better the words x[i]) from the RAM by the CPU leak the Hamming weight (HW) of the single words x[i]. This is a standard assumption in many side channel attacks since the words are moved over a relatively large bus. Then the attacker could identify X by comparing the sequence of the Measured values for the Hamming weights $$HW(x[0]),\ HW(x[1]),\ HW(x[m-1])$$

with the values $$HW(a[0]),\ HW(a[1]),\ HW(a[m-1])$$

and $$HW(b[0]),\ HW(b[1]),\ \ldots,\ HW(b[m-1])$$

where the last two sets of values where measured before the exchange operation (that is going to be attacked). This can work even, if the single values for the Hamming weight are somewhat fuzzy. The attacker only has to match the values HW(x[0]), HW(x[1]), . . . , HW(x[m−1]) with one of the others that is closer.

So the attacker could successfully analyze the exchange itself. Assume for example

```
EXCH((A,B),e)
is implemented by (for i=0, .. ,m-1)
   read a[i]
   read b[i]
   exchange or not exchange a[i],b[i] depending on e
   write the new a'[i]
   write the new b'[i]
```

Here, if the attacker could somehow measure HW(a[i]), HW(b[i]),HW($a'[i]$),HW(b'[i]) the attacker may check whether $$|HW(a[i])-HW(a'[i])|+|HW(b[i])-HW(b'[i])|$$

or $$|HW(a[i])-HW(b'[i])|+|HW(b[i])-HW(a'[i])|$$

is the smaller of the two numbers. If the first expression is smaller is more probable, otherwise e=1 is more probable. The attacker can do this for every i and combine the knowledge gained to get a result with higher confidence level.

This weakness of the exchange operation from above arises because the input values are the same as the output values and so a simple comparison of Hamming weights is possible.

This may be avoided by using a randomized (or "randomizing") exchange operation REXCH that outputs other values than the input values (independently from whether an exchange took place or not), namely values that represents the same relevant information as the input values but have a different form such that Hamming weight matching is not possible. Representing the same relevant information means the respective algorithm (e.g., software) is able to use the other values (that replace the input values) to compute the desired output—possibly with slight adaptations of the algorithm. The randomizing exchange operation works for example as follows:

```
Input:
  (A,B),
  e=0,1
Output:
  (X,Y) with
  X representing the same relevant information (e.g., value) like A but in a different
  physical form that does not allow Hamming weight matching,
  Y representing the same relevant information (e.g., value) like B but in a different
  physical form that does not allow Hamming weight matching, if e=0.
  (X,Y) with
  X representing the same relevant information (e.g., value) like B but in a different
  physical form that does not allow Hamming weight matching,
  Y representing the same relevant information (e.g., value) like A but in a different
  physical form that does not allow Hamming weight matching, if e=1.
```

In a generic situation, an attacker will not be able to compare Hamming weight sequences of xa, xb, xa*ra, xb*rb and match the a-s and the b-s.

As another example for a randomization (e.g., for RSA and elliptic curve cryptography), an additive randomization approach (i.e., adding a random number to a value to be randomized) may be used since coordinates of a point on an elliptic curve are in most cases integers modulo a large prime number p and values A in an ME are also integers modulo a large integer N. In this approach, instead of computing an operation A # B mod N, (# stand e.g., for "+" or "*") one is computing modulo N'=r'*N, for a relatively small (often 16-64 bit length) random non zero integer r'. In this case the number A has the same mathematical content (i.e., represents the same relevant information) regarding N like A±r*N. In other words, the identity $$A\#B \bmod N=((A-ra*N)\#(B+rb*N) \bmod N') \bmod N$$

for any random ra, rb is used, so the actual multiplication or addition (or (m) any other operations) is executed with the values (A+ra*N) and (B+rb*N) which are non deterministic and can in general not be compared with A and B by Hamming weight comparison.

So, an additive variant a-REXCU of REXCH with additive randomization works for elliptic curve point coordinates as well as for ME:

```
(a-REXCH)
Input:
  (A,B) two integers modulo N'(=N*r'),
  e=0,1
Output:
  (X,Y) with X:=A+ra*N, Y:=B+rb*N, if e=0
  (X,Y) with X:=B+rb*N, Y:=A+ra*N, if e=1
  for random ra, rb (which may be equal)
```

The equations are preferably all modulo N'.

It should be noted that a-REXCH is typically more suitable for RSA and m-REXCH is typically more suitable for ECC-implementation schemes, in particular since many moduli for elliptic curves (e.g., P-256, P-521) contain long runs of 0s or 1s, that make the additive randomization partially inefficient.

So, a processing may look like

```
- A ← operation1(...)
  B ← operation2(...)
- (X,Y) ← REXCH(A,B,rand,key):
    - (X,Y) ← exchange(A,B,key) + rand [modulo N'] (additive randomized
      exchange) or
```

For changing the values A and B without changing their mathematical meaning (i.e., such that the changed values represent the same relevant information for the respective algorithm), various randomization techniques may be used for generating randomized versions of the input values, like described in the following.

For elliptic curve cryptography, for example, a multiplicative randomization may be used using projective coordinates. As mentioned above if A is a point on an elliptic curve, it can be represented by projective coordinates (x,y,z), wherein the projective coordinates for a point are not unique:

$$(x,y,z)$$

and $$(x*r,y*r,z*r)$$

represent the same point, for any non-zero element r from K.

So, a multiplicatively randomized exchange m-REXCH that may be used for addressing the weakness described above, which uses multiplicative randomization (i.e., multiplying a value to be randomized with a random number) using the projective property, would be:

```
(m-REXCH for elliptic curves)
Input:
  (A,B) two points on E(K) with A=(xa,ya,za), B=(xb,yb,zb),
  e=0,1
Output:
  (X,Y) with X:=(xa*ra,ya*ra,za*ra), Y:=(xb*rb,yb*rb,zb*rb), if
e=0
  (X,Y) with X:=(xb*rb,yb*rb,zb*rb), Y:=(xa*ra,ya*ra,za*ra), if
e=1
  for random non zero ra, rb (which may or may not be equal)
```

-continued

```
    - (X,Y) ← exchange(A,B,key) * rand [modulo N'] (multiplicative
      randomized exchange)
  - operation3(X,...)
    operation4(Y,...)
```

The processing of the A and B can no longer be used as attack vector, because A and X and B and Y are different before and after the exchange and thus a comparison of A, B with X,Y does not help an attacker.

Regarding a side-channel robust realization of REXCH, it is important that the implementation of REXCH is not done by simply concatenating an EXCH with a randomization step in any order, because there is a chance that the single EXCH can be successfully attacked. So the REXCH is realized in an atomic way, where the intermediary values do not reveal the e, i.e., the exchange/non-exchange-information. In other words, the exchange is combined with a randomization (additive. XOR, multiplicative) in an atomic way, such that, the pure exchange cannot be isolated any more.

One way to implement this REXCH is based on the following observation about the EXCH:

```
If
  (X,Y) := EXCH((A,B),e), for e=0,1
then
  X = (1−e)*A + e*B        = A + e * (B−A)
  Y = e*A + (1−e)*B        = B − e * (B−A)
```

It should be noted that Y=A+B−X so Y can also be calculated when X has been determined.

By writing e as a sum and/or difference of at least three random values (e.g., of CPU word size), the exchange operation can be made secure as follows:

Re-code e by $$e=f+g-h$$

such that for example f, g are random and h:=f+g−e. These values may for example be determined from the output of a random number generator of the respective device 101, 102. Then $$\begin{aligned} X &= A+(f+g-h)*(B-A) \\ &= A+f*(B-A)+g*(B-A)-h*(B-A) \end{aligned}$$

Since f,g,h are (pseudo-)random, the (long-integer) multiplications $$U:=f*(B-A)$$

$$V:=g*(B-A)$$

$$W:=h*(B-A)$$

do not leak significant information about e.

Now an additive randomized exchange a-REXCU could be realized by computing $$X=(A+U+ra*N+V)-W$$

$$//=EXCH((A,B),e)+ra*N$$

$$Y=(A+B)-X$$

As above, ra is a random integer (i.e., derived from random number generator output) and may be relatively small (e.g., 16-64 bit length). All the computations and equations are true as non-modular ones but can be done modulo N' (with N'=N*r'). In that case, one does not have to take care of negative integers. The value r:=ra*N may be seen as a randomization value.

U, V, W are also referred herein as intermediary values, wherein the randomization values may be included, i.e., U+ra*N may be seen as an intermediary value which depends on the randomization value. The formula for calculating X may be seen as arithmetically assembling the intermediary values. (B−A) can be seen as a modification value (of which the intermediary value depend).

It should be noted that the order of additions within the formula

X=(A+U+ra*N+V)−W is of importance: it is not computed in the order $$X=(A\pm f*(B-A)+g*(B-A)-h*(B-A))+ra*N$$

because in this case, the result of the outer brackets contains A or B and may leak side channel information.

Although there is still the computation of out of e which may leak, this operation on simple and single words can be easier made secure than the original exchange operation that works on long integers with m words, because the m words give m places for side channel leakage.

It should further be noted that a split up (re-code) of e in more than three parts (i.e., more than f, g, h) may also be done. However, according to various embodiments, at least three parts are used because if, in case of only two parts, for example e=f−g then HW(f)=HW(g) implies e=0 and otherwise e=1.

Since the above was an implementation of an additive randomizing exchange, an implementation for the multiplicative version m-REXCH of REACH is given in the following, wherein it is described for only one of the three coordinates for simplicity, i.e., (A,B):=(xa,xb) and may be applied three times to cover all three coordinates.

(X,Y):=m-REXCH((A,B),e), for e=0,1 can be computed as follows:

$$e=f+g-h$$

choose random r $$U:=f*r*(B-A)$$

$$V:=g*r*(B-A)$$

$$W:=h*r*(B-A)$$

$$X:=r*A+U+V-W//=r*A \text{ or } r*B$$

$$Y:=(A+B)*r-X$$

U, V, W are also referred herein as intermediary values. The formula for calculating X may be seen as arithmetically assembling the intermediary values. (B−A) can be seen as a modification value (of which the intermediary value depend)

An alternative way to realize the m-REXCH is the following which takes more care of the secure re-coding of e and is based on the following observation: let e=D_i, i.e., the key bit e is the bit of the binary representation of D. D may be a word of the secret d (containing the bit d_i from Algorithms 1&2). Let z:=2^i, and set:

```
  E := D xor z // bitwise xor
then
  E = D + z if e = 0
  E = D − z if e = 1
or re-written
  E − D = z if e=0
  E − D = −z if e=1
It should be noted that
  2*A = (A+B)+(A−B)
  2*B = (A+B)−(A−B)
and similarly
  2*z*A = z*(A+B)+z*(A−B)
  2*z*B = z*(A+B)−z*(A−B)
So, if e=0 then
  2*z*A = z*(A+B)+(E−D)*(A−B)
  2*z*B = z*(A+B)−(E−D)*(A−B)
and if e=1 then
  2*z*B = z*(A+B)+(E−D)*(A−B)
  2*z*A = z*(A+B)−(E−D)*(A−B)
```

So, this formula is suitable for a randomized exchange operation, in particular for a multiplicatively randomized one:

$$(X,Y):=m\text{-REXCH}((A,B),e),\ \text{for}\ e=D\_i=0,1$$

can be computed as follows:

```
z := 2^i
E := D x or z
write randomly:
E = E1 + E2
D = D1 + D2
// now E1+E2−D1−D2 = +/− 2*z if e=0/1
choose random r
U := (A+B)*r*z
V := (A−B)*(r*E1) + (A−B)*(r*E2) − (A-B)*(r*D1) − (A-B)*(r*D2)
// where the single summands are preferably modular products
X := U+V
Y := U−V
```

Here, A+B may be seen as a modification value as well as A−B. Again, intermediary values ((A−B)*(r*E1), (A−B)*(r*E2), . . . ) depending on the modification values and the randomization value (as well as on the key shares) are assembled for calculating X.

Also in this case, the important computations on E and D and (r*E1) . . . are not operations on long integers but rather on integers of the size one or two words, which may leak less than the long integer computations.

Further variants are possible. For example, the critical value D may be given in a Boolean masked way: D=D' xor D". Then E can easily be computed by applying the z to only one of the words. Then a mask change algorithm may be implemented to transform the Boolean shares D',D" to the arithmetic shares D1,D2. Same for E. This gives a fully randomized implementation of the exchange even from the entry point on.

Furthermore, the approaches described may be extended to work for polynomials instead of integers.

Thus, according to various embodiments, a method to conditionally exchange two values, depending on a bit-information, is provided such that the conditionally exchanged values are randomized variants of the two input values, the exchange process does not contain a simple exchange (i.e., {input}={output} as a set) of two values that depends on the said bit-information. The randomization may happen by multiplication or by addition utilizing randomized modulus.

In the following, a hardware implementation for a randomization, e.g., according to (a-REXCH) and (m-REXCH) as described above, is described.

FIG. 2 shows an exchange and randomizing circuit 200 according to an embodiment.

In this embodiment, a key (bit) value k is split (or decomposed) into multiple random shares, for example into five (random) shares according to $$k=exch0\oplus exch1\oplus xch2\oplus exch3\oplus exch4$$

e.g., based on the output of a random number generator. This splitting (or decomposing) may be performed by another circuit (e.g., a control input circuit) of a larger circuit to which both this other circuit and the exchange and randomizing circuit 200 belong. Splitting a value into multiple random shares can thus be understood as randomly (e.g., based on random number generator output) determining shares whose combination (e.g., XOR combination) gives the value.

The circuit 200 is further connected to a memory 202 having memory locations 203, 204 for a first memory address a0 and a second memory address a1, respectively. The circuit 200 includes registers 205 denoted by r1, r2, r3, r4 and r5, respectively.

The circuit 200 implements, for default values (e.g., all shares equal to 0) the following operations:

$$\text{LDR}\ r0\leftarrow a0$$

$$\text{LDR}\ r1\leftarrow a1$$

$$\text{LDR}\ r2\leftarrow a\_\text{add}$$

$$\text{ADD}\ r3\leftarrow r0+r2$$

$$\text{ADD}\ r4\leftarrow r1+r2$$

$$\text{STR}\ r3\rightarrow a0$$

$$\text{STR}\ r4\rightarrow a1$$

where LDR stands for load register and STR stands for store register and ADD is an adding operation performed by an adder 201 (i.e., a hardware circuit for adding to two words supplied from two registers, here from r0 and r2 for one adding operation and r1 and r2 for the other adding operation).

Each share exch0, exch1, exch2, exch3, exch4 when having a different value than its default value (e.g., 1 instead of 0) changes this operation at a respective point (associated with that share).

Specifically, the key share exch0 controls the load order. It can thus be seen as memory load location control share. This means that, for example, if exch1, exch2, exch3, exch4 are at their default values but exch1 is set to the value different from its default value, the operation is LDR $r0 \leftarrow a1$ LDR $r1 \leftarrow a0$ LDR $r2 \leftarrow a\_add$ ADD $r3 \leftarrow r0+r2$ ADD $r4 \leftarrow r1+r2$ STR $r3 \rightarrow a0$ STR $r4 \rightarrow a1$ The key share exch1 controls the input register index. It can thus be seen as input register control share. This means that, for example, if exch0, exch2, exch3, exch4 are at their default values but exch1 is set to the value different from its default value, the operation is LDR $r1 \leftarrow a0$ LDR $r0 \leftarrow a1$ LDR $r2 \leftarrow a\_add$ ADD $r3 \leftarrow r0+r2$ ADD $r4 \leftarrow r1+r2$ STR $r3 \rightarrow a0$ STR $r4 \rightarrow a1$ The key share exch2 controls one of the input to the adder. It can thus be seen as randomization control share. This means that, for example, if exch0, exch1, exch3, exch4 are at their default values but exch2 is set to the value different from its default value, the operation is LDR $r0 \leftarrow a0$ LDR $r1 \leftarrow a1$ LDR $r2 \leftarrow a\_add$ ADD $r3 \leftarrow r1+r2$ ADD $r4 \leftarrow r0+r2$ STR $r3 \rightarrow a0$ STR $r4 \rightarrow a1$ The key share exch3 controls the result register index. It can thus be seen as output register control share. This means that, for example, if exch0, exch1, exch2, exch4 are at their default values but exch3 is set to the value different from its default value, the operation is LDR $r0 \leftarrow a0$ LDR $r1 \leftarrow a1$ LDR $r2 \leftarrow a\_add$ ADD $r4 \leftarrow r0+r2$ ADD $r3 \leftarrow r1+r2$ STR $r3 \rightarrow a0$ STR $r4 \rightarrow a0$ The key share exch4 controls the store order. It can thus be seen as memory store location control share. This means that, for example, if exch0, exch1, exch2 and exch3 are at their default values but exch4 is set to the value different from its default value, the operation is LDR $r0 \leftarrow a0$ LDR $r1 \leftarrow a1$ LDR $r2 \leftarrow a\_add$ ADD $r3 \leftarrow r0+r2$ ADD $r4 \leftarrow r1+r2$ STR $r3 \rightarrow a1$ STR $r4 \rightarrow a0$ When more than one key share is different from its default value, the operation changes accordingly at all the points associated with the key shares which are not at their default value.

The impact on the operation is for example by switches (e.g., multiplexers) 207 wherein each switch is configured to switch between two paths in accordance with the respective key share supplied to it as control bit.

So, each key share is used in at a different point in the algorithm (and accordingly, the hardware implementing this algorithm) for randomization to exchange respective data, thus realizing key value-dependent exchange and randomization.

The decomposition of the key value into shares may be refreshed after each processing of a value pair (a0, a1), i.e., the shares are re-randomized after each randomizing exchange.

It should be noted that an additional share (for a total of six shares may be used which switches the input of the store (STR) operations.

By the approach as described above with reference to FIG. 2 a single point of attack can be avoided since five probing or template attacks have to be combined. Further, no averaging is possible (randomized after each iteration). It may be implemented at very low hardware cost, very low performance cost and provides high security. It can be generally seen as processing a secret in multiple shares (five in the above example but more and less are possible) by an atomic sequence that applies the shares in different parts of the sequence wherein each share is, according to one embodiment, used only once. It allows a randomized exchange with strong side-channel robustness.

The approach described above with reference to FIG. 2 allows providing a hardware circuit for additive randomizing exchange. However, for ECC, multiplicative re-masking is often preferred: crypto libraries may operate on a ring Z/p*r (where r is a random 64-bit number) and in ECC, many moduli are of special form (e.g., p=2^521−1) and the randomization factor has long sequences of 0000's and 1111's. An additive re-masking with a multiple of p or p*r adds no randomization to parts of the coordinates (while this works well for RSA).

However, building a hardware circuit that can be used for a multiplicative randomized exchange is hard.

Therefore, according to various embodiments, an approach is provided for reducing a multiplicative randomizing exchange to an additive randomizing exchange, i.e., for implementing a multiplicative randomizing exchange by means of an implementation of an additive randomizing exchange, for which then a hardware circuit like described with reference to FIG. 2 may then be used.

Specifically, two projective points (x1, y1, z1) and (x2, y2, z2) may be exchanged, including a multiplicatively randomization with a randomization value r, as follows:

```
1)  a <-- rand( )                   // temporary additive remasking value
2)  r <-- rand( )                   // multiplicative remasking value
3)  ar <-- a*r
4)  a-REXCH(x1,x2,a,key)             //i.e., x1' <-- x1 or x2 (depending on key) + a and
    x2' <-- x1 or x2 (depending on key) + a
5)  x1" <-- x1'*r - ar = (x1+a)*r - ar     = x1*r   // convert additive
    randomization to multiplicative randomization
6)  x2" <-- x2'*r - ar                     = x2*r
7)  repeat 4) to 6) for y and z (instead of x)
```

The operation of 4) may be performed by a first circuit (e.g., as illustrated in FIG. 2) and the operations of 5) and 6) may be performed by a second circuit. The operations of 5) and 6) may be seen as to multiplicatively randomizing the two additively randomized values (which are the result of operation 4) by multiplying them with a multiplicative randomization value (r) to generate two additively and multiplicatively randomized values and to remove (subtract) the component (ar) of the additive randomization value (a) multiplied by the multiplicative randomization value from the two additively and multiplicatively randomized values to generate two multiplicatively randomized values Randomization is here done in projective coordinates instead of modular arithmetic. The above multiplicative randomizing exchange can be implemented at low cost: seven short multiplications (if r is chosen to be only, e.g., 32-bit), six subtractions, three additive randomizing exchanges, two random number generations.

Figure 3:
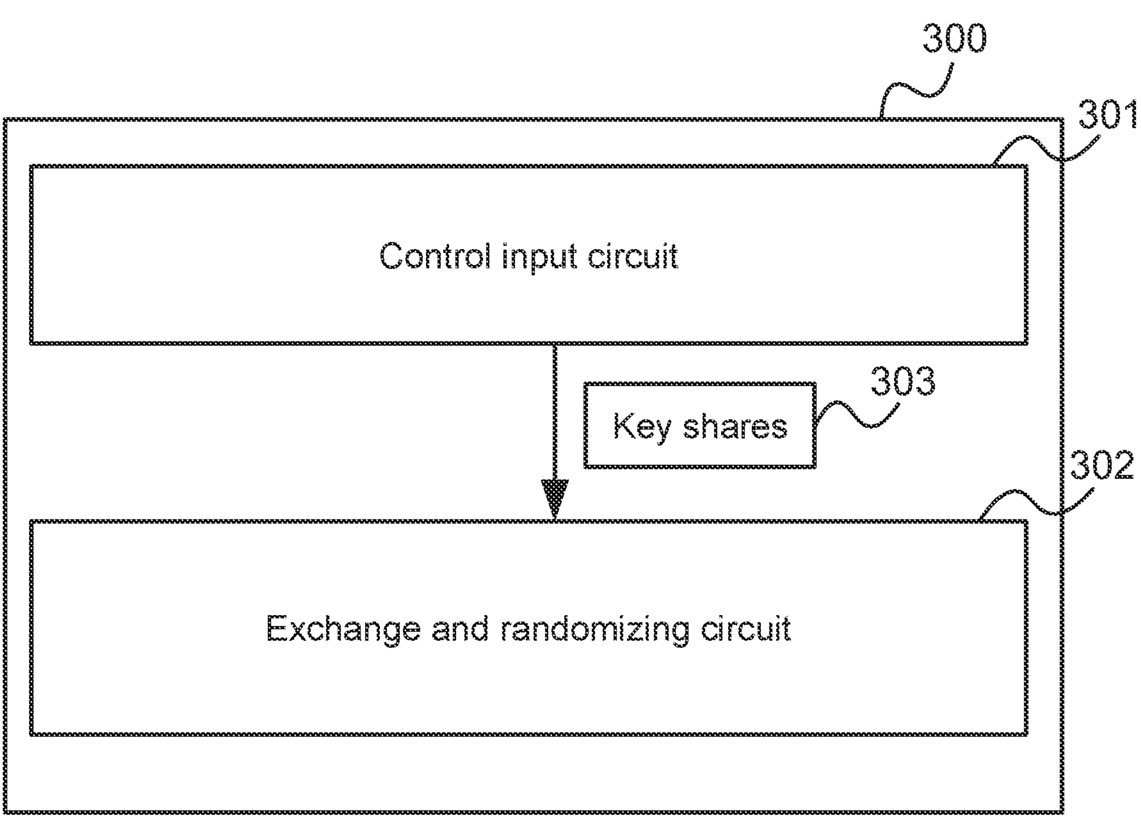
FIG. 3 shows a circuit for a combined key value-dependent exchange and randomization of two values according to an embodiment.

In summary, according to various embodiments, a circuit is provided as illustrated in FIG. 3.

FIG. 3 shows a circuit 300 for a combined key value-dependent exchange and randomization of two values according to an embodiment.

The circuit 300 includes an exchange and randomizing circuit 302 and a control input circuit 301 configured to split a key value into two or more shares 303 and to supply the two or more shares 303 to the exchange and randomizing circuit 302.

The exchange and randomizing circuit 302 is configured to

- supply each of the two values to one of two inputs, wherein it depends on at least a first share of the two or more shares 303 which value of the two values is supplied to which input of the two inputs;
- arithmetically combine, for each of the two inputs, the value supplied to the input with a randomization value to generate a respective randomized value and
- store the randomized values in two result locations, wherein it depends on at least a second share of the two or more shares 303 which randomized value is stored into which result location of the two result locations.

Various Examples are described in the following:

Example 1 is a circuit as described with reference to FIG. 3.

Embodiment 2 is the circuit of example 1, wherein the result locations are output registers or memory addresses.

Embodiment 3 is the circuit of example 1 or 2, wherein the circuit is configured to supply the two values from memory to the two inputs.

Embodiment 4 is the circuit of any one of examples 1 to 3, wherein each of the two inputs includes an input register and, for each input, supplying the respective one of the two values to the input includes storing the respective one of the two values in the input register.

Embodiment 5 is the circuit of any one of examples 1 to 4, wherein the two or more shares include a memory load location control share and wherein the exchange and randomizing circuit is configured to supply the two values to the inputs by means of two load operations from memory, wherein it depends from the memory load location control share of the two or more shares which load operations loads from which memory address.

Embodiment 6 is the circuit of any one of examples 1 to 5, wherein the two or more shares include a input register control share and wherein the exchange and randomizing circuit is configured to supply the two values to the two inputs by means of two memory operations, wherein it depends from the input control share of the two or more shares which memory operation supplies to which input.

Embodiment 7 is the circuit of any one of examples 1 to 6, wherein the two or more shares include a randomization control share and wherein the exchange and randomizing circuit is configured to arithmetically combine the values supplied to the inputs with the randomization value by two combining operations, wherein it depends from the randomization control share of the two or more shares which combining operation combines which value with the randomization value.

Embodiment 8 is the circuit of any one of examples 1 to 7, wherein the two or more shares include an output register control share wherein the exchange and randomizing circuit is configured to store the randomized values into two output registers, wherein it depends from the output register control share of the two or more shares which randomized value is stored into which output register.

Embodiment 9 is the circuit of any one of examples 1 to 8, wherein the two or more shares include a memory store location control share and wherein the exchange and randomizing circuit is configured to store the two randomized values in memory by means of two store operations, wherein it depends from the memory store location control share which store operation stores to which memory address.

Embodiment 10 is the circuit of example 9, wherein the two or more shares include a store operation input control share and wherein it depends from the store operation input control share which store operation stores which randomized value.

Embodiment 11 is the circuit of any one of examples 1 to 10, configured to receive a sequence of pairs, each pair including two values, wherein the control input circuit is configured to split, for each pair, a respective key value into two or more shares and to supply the two or more shares to the exchange and randomizing circuit, and the exchange and randomizing circuit is configured to, for each pair, supply each of the two values to one of two inputs, wherein it depends on at least a first is share of the two or more shares which value of the two values is supplied to which input of the two inputs;

arithmetically combine, for each of the two inputs, the value supplied to the input to generate a respective randomized value, and store the randomized values in two result locations, wherein it depends on at least a second share of the two or more shares which randomized value is stored into which result location of the two result locations.

Embodiment 12 is the circuit of any one of examples 1 to 11, wherein the control input circuit is configured to split the key value into the two or more shares such that an exclusive-or combination of the two or more shares gives the key value.

Embodiment 13 is the circuit of any one of examples 1 to 12, wherein, for each input, arithmetically combining the value supplied to the input with the randomization value includes adding the randomization value to the value.

Embodiment 14 is a data processing device including the circuit of any one of examples 1 to 13, wherein the data processing device is configured to perform a modular exponentiation for a cryptographic operation and is configured to perform a combined key value-dependent exchange and randomization of two input values for the modular exponentiation by means of the circuit and to determine a result of the modular exponentiation using the randomized values.

Embodiment 15 is a data processing device including the circuit of any one of examples 1 to 13, wherein the data processing device is configured to perform a scalar multiplication for a cryptographic operation and is configured to perform a combined key value-dependent exchange and randomization of two input values for the scalar multiplication by means of the circuit and to determine a result of the scalar multiplication using the randomized values.

Although specific embodiment have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A circuit for a combined key value-dependent exchange and randomization of two values, comprising:

an exchange and randomizing circuit;

a control input circuit configured to split a key value into two or more shares and to supply the two or more shares to the exchange and randomizing circuit, wherein the exchange and randomizing circuit is configured to supply each of the two values to one of two inputs, wherein which value of the two values is supplied to which input of the two inputs depends on a first share of the two or more shares and does not depend on a second share of the two or more shares;

arithmetically combine, for each of the two inputs, the value supplied to the input with a randomization value to generate a respective randomized value; and store the randomized values in two result locations, wherein which randomized value is stored into which result location of the two result locations depends on the second share of the two or more shares and does not depend on the first share of the two or more shares.

2. The circuit of claim 1, wherein the result locations are output registers or memory addresses.

3. The circuit of claim 1, wherein the circuit is configured to supply the two values from memory to the two inputs.

4. The circuit of claim 1, wherein each of the two inputs comprises an input register and, for each input, supplying the respective one of the two values to the input comprises storing the respective one of the two values in the input register.

5. The circuit of claim 1, wherein the first share of the two or more shares is a memory load location control share and wherein the exchange and randomizing circuit is configured to supply the two values to the inputs by means of two load operations from memory, wherein which load operations loads from which memory address depends on the memory load location control share.

6. The circuit of claim 1, wherein the first share of the two or more shares is an input register control share and wherein the exchange and randomizing circuit is configured to supply the two values to the two inputs by means of two memory operations, wherein which memory operation supplies to which input depends on the input control share.

7. The circuit of claim 1, wherein the two or more shares comprise a randomization control share and wherein the exchange and randomizing circuit is configured to arithmetically combine the values supplied to the inputs with the randomization value by two combining operations, wherein which combining operation combines which value with the randomization value depends on the randomization control share of the two or more shares.

8. The circuit of claim 1, wherein the second share of the two or more shares is an output register control share wherein the exchange and randomizing circuit is configured to store the randomized values into two output registers, wherein which randomized value is stored into which output register depends on the output register control share.

9. The circuit of claim 1, wherein the second share of the two or more shares is a memory store location control share and wherein the exchange and randomizing circuit is configured to store the two randomized values in memory by means of two store operations, wherein which store operation stores to which memory address depends on the memory store location control share.

10. The circuit of claim 9, wherein the two or more shares comprise a store operation input control share and wherein which store operation stores which randomized value depends from the store operation input control share.

11. The circuit of claim 1, configured to receive a sequence of pairs, each pair comprising two values, wherein the control input circuit is configured to split, for each pair, a respective key value into two or more shares and to supply the two or more shares to the exchange and randomizing circuit, and the exchange and randomizing circuit is configured to, for each pair:

supply each of the two values of the respective pair to one of two inputs, wherein which value of the two values of the respective pair is supplied to which input of the two inputs depends on at least a first share of the two or more shares of the respective key value;

arithmetically combine, for each of the two inputs, the value supplied to the input to generate a respective randomized value, and to store the randomized values in two result locations for the respective pair, wherein which randomized value is stored into which result location of the two result locations for the respective pair depends on at least a second share of the two or more shares of the respective key value.

12. The circuit of claim 1, wherein the control input circuit is configured to split the key value into the two or more shares such that an exclusive-or combination of the two or more shares gives the key value.

13. The circuit of claim 1, wherein, for each input, arithmetically combining the value supplied to the input with the randomization value comprises adding the randomization value to the value.

14. A data processing device comprising the circuit of claim 1, wherein the data processing device is configured to perform a modular exponentiation for a cryptographic operation and is configured to perform a combined key value-dependent exchange and randomization of two input values for the modular exponentiation by means of the circuit and to determine a result of the modular exponentiation using the randomized values.

15. A data processing device comprising the circuit of claim 1, wherein the data processing device is configured to perform a scalar multiplication for a cryptographic operation and is configured to perform a combined key value-dependent exchange and randomization of two input values for the scalar multiplication by means of the circuit and to determine a result of the scalar multiplication using the randomized values.

* * * * *